Patented Dec. 12, 1939

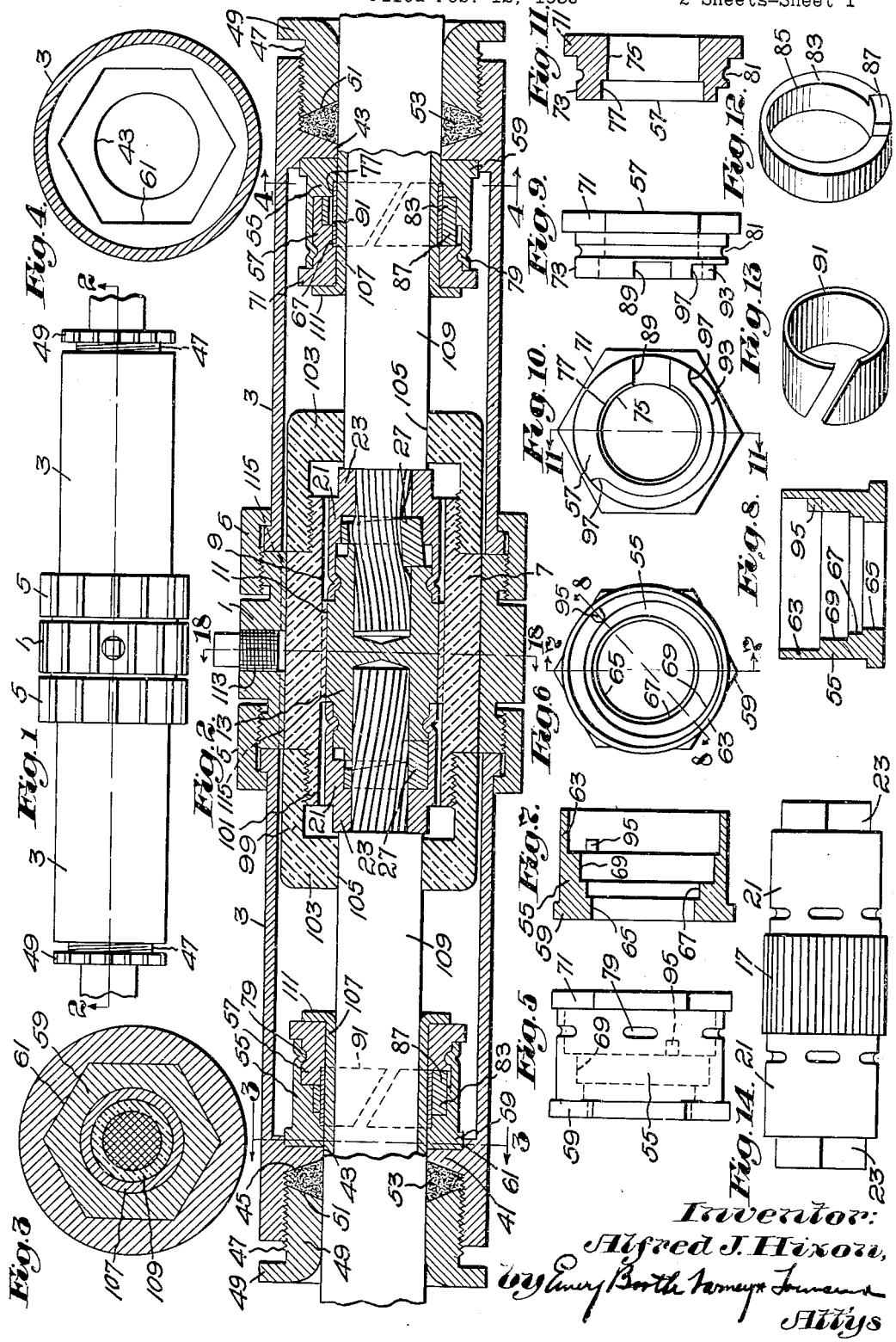

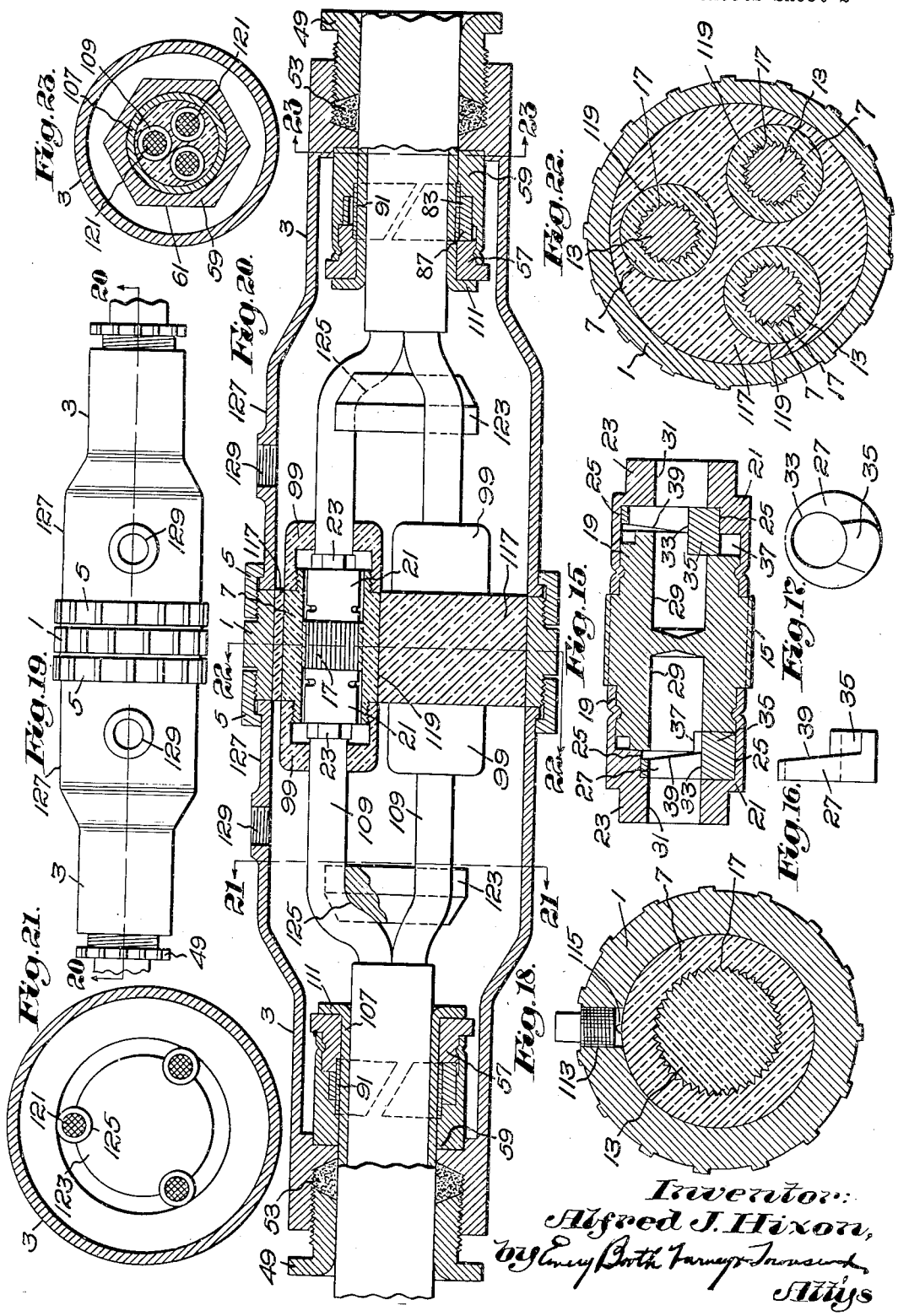

2,182,896

UNITED STATES PATENT OFFICE 2,182,896

CABLE SPLICE AND THE LIKE

Alfred J. Hixon, Braintree, Mass.

Application February 12, 1935, Serial No. 6,191

3 Claims. (Cl. 24—243)

My invention relates to connecting devices for electric cables and the conductors thereof as, for example, devices for connecting one cable to another or to junction boxes, distributing boxes, and the like.

The invention, which aims to provide an improved casing for the end portion of the cable and its conductors, will be best understood from the following description of several embodiments of the invention when read in the light of the accompanying drawings, while the scope of the invention will be more particularly pointed out in the appended claims.

In the drawings:

Figure 1 is a side elevation of a cable splice constructed according to the invention;

Fig. 2 is a section on the line 2—2 of Fig. 1 on an enlarged scale;

Fig. 3 is a section on the line 3—3 of Fig. 2;

Fig. 4 is a section on the line 4—4 of Fig. 2 with the cable and cable collar omitted;

Fig. 5 is a side elevation of the cable collar;

Fig. 6 is an end elevation of the outer relatively rotatable member of the cable collar before the member is assembled with the inner relatively rotatable member of the collar;

Figs. 7 and 8 are sections on the lines 7—7 and 8—8 of Fig. 6;

Fig. 9 is a side elevation of the inner relatively rotatable member of the cable collar;

Fig. 10 is an end elevation of Fig. 9 as viewed from the left;

Fig. 11 is a section on the line 11—11 of Fig. 10;

Fig. 12 is a perspective of the eccentric member of the cable collar;

Fig. 13 is a perspective of the split ring of the cable collar;

Fig. 14 is a side elevation of the cable connector according to Fig. 1;

Fig. 15 is a longitudinal section of the cable connector with the cable conductors ommitted, the parts at the left hand side of the figure being shown in position to receive a cable, and the parts at the right hand side being shown in the position of parts when the end member is rotated through 180° from the position of the corresponding end member at the left hand side of the figure;

Fig. 16 is a side elevation of the conductor gripper of the cable connector;

Fig. 17 is an end elevation according to Fig. 16 as viewed from the right;

Fig. 18 is a section on the line 18—18 of Fig. 2;

Fig. 19 is a side elevation of a modified form of cable splice;

Fig. 20 is a section on the line 20—20 of Fig. 19 on an enlarged scale; and

Figs. 21, 22 and 23 are sections on the lines 21—21, 22—22 and 23—23 respectively of Fig. 20.

In the embodiment of the invention illustrated by Figs. 1 to 18, the cable splice comprises a casing having a central metallic ring member 1 to the opposite sides of which are detachably secured sleeve-like casing members 3. For detachably securing the members 1 and 3 to each other, the latter are provided with union-nuts 5 adapted to be screw-threaded on the member 1 for holding the adjacent end surfaces of the members 3 against the member 1 to form a fluid tight joint. As this construction is that of the common pipe union, and will be obvious from the drawings to those skilled in the art, further description of the same is believed unnecessary.

The central ring member 1 fixedly carries an insulating body or sleeve 7, preferably formed of laminated phenol condensation product and fabric, this body being turned exteriorly to a cylindrical shape and being driven into the member 1 so as to be rigidly connected thereto. As shown, the insulating sleeve 7 has an interior axial bore 9 provided with a reduced diameter portion 11 intermediate its length. Into this reduced diameter portion is driven a connector for the conductors of the two cables. This connector forms the subject matter of applicant's copending application Serial Number 4,513, filed February 1, 1935, and therefore will not be described herein with any more particularity than necessary to define how it coacts with the present invention.

As illustrated (Figs. 2, 14, 15, 16, 17 and 18) the conductor connector comprises a central body member 13 having a large diameter portion 15 (Fig. 15), which latter exteriorly thereof is provided with the longitudinally extending knurls 17 (Figs. 14 and 18). The bore 11 of the insulating sleeve 7 is of approximately the diameter of the central body member of the connector at the bottom of the knurls 17. When the connector is driven into the insulating sleeve, as illustrated in Figs. 2 and 18, the knurls cut into the material of the sleeve and therefore hold the central body member of the connector against rotatable and longitudinal movement relative to the sleeve.

On the reduced diameter portions 19 of the central body member 13 of the connector are rotatably mounted the end members 21. Exteriorly these end members are of slightly less diameter than the bore 9 of the insulating body 7. The end portions 23 of the members 21 project beyond the ends of the insulating body 7 and are suitably formed for engagement with a wrench.

Each end member is formed with an eccentric bore 25 (Fig. 15) which rotatably receives a ring member 27 (Figs. 16 and 17). The end members 21 and central body member 13 of the connector are formed with axial bores 29 and 31 respectively, while the ring members 27 have eccentric bores 33. The ring members 27 at one side thereof have lugs 35 which fit into slots 37 formed in the central body members, so that when the end members 21 are rotated relative to the central body member 13 the ring members 27 will be moved transversely relative to both the members 13 and 21 to grip the cable conductor inserted in the bores. The parts at the right hand side of Fig. 15 are shown in position to receive the conductor. The parts at the left hand side of this figure are shown in the position assumed when the end member 21 is rotated to move the ring member transversely of the other members without a cable inserted. As shown, the eccentric ring member has a side 39 thereof beveled so that when the cable is inserted and gripped the ring member tilts, as indicated at the right hand side of Fig. 2, to make a wedge-shaped opening which causes the conductor to be more easily locked in position. At the left hand end of Fig. 2 are shown the conductor inserted and the parts in position preparatory to gripping the conductor.

As illustrated, the casing members 3 have end walls 41 provided with openings 43 through which the cable extends. The outer side 45 of the end wall is beveled to make it of frusto-conical shape, and the portion of the member 3 adjacent said wall is screw-threaded, as indicated at 47, for receiving a packing gland 49 the end 51 of which is beveled in the opposite direction from the side 45 of the wall 41 so that the gland is effective to compress a flexible packing ring 53 against the cable and render the joint fluid tight.

For relieving strains on the connector, each cable has clamped to it a collar comprising the outer member 55 and the inner relatively rotatable member 57. The member 55 abuts the end wall 41 of the casing member 3, and, as shown, has a hexagonal enlargement 59 adapted to be received in a hexagonal recess 61 formed in the end wall. This prevents withdrawal of the cable after the collar is clamped to it, and locks the cable against rotative movement relative to the casing.

As shown, the outer member 55 of the collar is provided with a sleeve portion 63, an axial bore 65 which is slightly enlarged at 67, and an eccentric bore 69. The inner member 57 of the collar is provided with a hexagonal base portion 71 provided with an exterior cylindrical extension 73, the member having a bore 75 for receiving the cable, which bore is provided with a slightly enlarged diameter portion 77. In assembling the collar, the sleeve portion 63 of the member 57 fits over the exterior surface of the cylindrical extension 73 of the member 57, and the two are secured against axial separation by "staking" portions 79 of the sleeve in the annular groove 81 formed in the exterior surface of the cylindrical extension 73.

The eccentric bore 69 of the member 55 receives a ring 83 (Fig. 12) having an eccentric bore 85 and a lug 87 projecting laterally from one side thereof at the thickest portion of the ring. This lug is received in a slot 89 formed in the member 57, so that when the members 55 and 57 are relatively rotated the ring will be held against substantial rotation relative to the member 57 and will rotate in the eccentric bore 69 relative to the member 55 so as to move the ring transversely of the members 55 and 57. Received in the bore 85 of the ring 83 is a split resilient ring 91, one end portion of which is received by the bore 67 of the member 55 and the other end portion by the bore 77 of the member 57, so that the split ring is restrained against motion transversely of the members 55 and 57 and is therefore compressed against the cable when the ring 83 is moved transversely of said members by relative rotation between them, this securely locking the collar to the cable.

For limiting the relative rotation between the members 55 and 57 sufficiently to compress the ring the desired amount, the end portion of the cylindrical extension 73 of the member 57, as shown, is provided with an arcuate groove 93 which receives the lug 95 formed internally of the member 85, the end walls 97 of the groove 93 acting as stops for this lug. When the lug is against one end wall 97 the ring 91 will be expanded to permit the collar to be slid along the cable. When the lug is against the other end wall 97 the ring 91 will be compressed to lock the collar to the cable.

For further insulating the conductor connector from the casing member, caps 99 of insulating material are provided which at one end are internally screw-threaded to coact with the external screw-threads on the projecting sleeve portions 101 of the insulating bushing 7. As shown, the end walls 103 of the caps are provided with openings 105 which slidably fit about the cable.

In making the splice a packing gland 49, a packing ring 53, a casing sleeve 3, an assembled cable collar, and a cap 99 are then slid, in the order named, over the end of each cable. A portion of the lead sheathing 107 of each cable is then stripped to bare the insulation 109 of the cable, which latter is then stripped to bare the end portion of the conductor, as shown by Fig. 2. The collars may then be slid into the positions shown in Fig. 2, which positions may be determined by temporarily inserting the conductors in the connectors and sliding the sleeves 3 into abutting relation with the ring 1, making sure that the collars enter the recesses 61 in the sleeves. Then after withdrawing the conductors from the connectors and sliding the sleeves out of the way, the collars may be clamped to the cables. The lead sheathings may now be flanged against the ends of the collars, as indicated at 111, or, if desired, these flanges may be made at any position so long as sufficient space is left for the caps 99 before they are screwed on the sleeves 101 of the insulating body 7. The bared ends of the cables may then be entered into the conductor connectors, and the latter operated to clamp the conductors to them, after which the caps 99 may be screwed into position. The sleeves 3 may then be slid against the central ring member 1 with the collars received by the recesses 61, and by means of the union-nuts 5 the sleeves may be secured to the ring member, after which the packing may be slid along the cable against the end walls 41 of the sleeves and the glands then slid along the cable and screwed into the sleeves for packing the joints. If desired, the interior of the casing may now be exhausted and filled with an inert gas or with insulating compound through an opening 113 which communicates with the interior of each sleeve 3 through a passage or groove 115 formed in the surface of the internal bore of the ring member 1.

The modification of the invention shown by Figs. 19 to 23 shows a cable splice for cables having three conductors, the construction being very similar to that of the modification heretofore described. As shown, the central ring member 1 receives, by means of a driving fit, a body of insulating material 117 which is provided with three bores 119 into which the insulating sleeves 7 above described are driven, the insulating sleeves being formed exactly as hereinbefore described and receiving the conductor connectors for the three conductors 121 of the cables. Properly to space the three conductors, suitable spacing members 123 may be provided, these spacing members being grooved, as indicated at 125, for receiving the bent portions of the insulated conductors as they leave the body of the cable. Otherwise the two forms of cable splice are the same, except that the sleeve members 3 are suitably enlarged at 127 to engage with the enlarged ring 1, and are provided with separate screw-threaded orifices 129 adapted to be closed by plugs after the interior of the casing is exhausted and filled with inert gas or insulating compound.

It will be understood that wide deviations may be made from the forms of the invention shown without departing from the spirit thereof.

I claim:

1. A collar adapted to be slid along an insulated cable received thereby and to be clamped thereto in adjusted positions having, in combination, a pair of sleeves one of which is mounted upon the other for relative rotation, said sleeves being formed with aligned open-ended bores through which the cable may extend, means restraining said sleeves against axial separation under axial directed forces, a ring member having an outer cylindrical surface, one of said sleeves having an eccentric counter bore for receiving said ring and rotatably fitting the outer surface thereof, means for restraining said ring against substantial axial rotation relative to the other of said sleeves when said sleeves are relatively rotated, and a split sleeve extending through said ring and adapted to contact with the bore thereof, said split sleeve also being adapted to contact with the walls of said bores of said relatively rotatable sleeves at opposite sides of said ring and being restrained against substantial movement longitudinally of said bores.

2. A collar for a cable or the like comprising a body having relatively rotatable parts provided with openings for receiving the cable, an eccentric member having an opening for receiving the cable, which eccentric member is rotatably mounted on one of said parts eccentrically to the axis of relative rotation of said parts, means restraining said eccentric member against substantial rotation relative to the other of said parts whereby said member is moved transversely of said openings of said parts by relative rotation of said parts, and cable gripping means operated by said eccentric member for gripping said collar to the cable.

3. A collar for a cable or the like comprising a body having relatively rotatable parts provided with openings for receiving the cable, an eccentric member having an opening for receiving the cable, which eccentric member is rotatably mounted on one of said parts eccentrically to the axis of relative rotation of said parts, means restraining said eccentric member against substantial rotation relative to the other of said parts whereby said member is moved transversely of said openings of said parts by relative rotation of said parts, and a split ring surrounded by and adapted to be contracted by transverse movement of said eccentric member for gripping said collar to the cable.

ALFRED J. HIXON.